United States Patent [19]

Jeffries et al.

[11] 4,156,439
[45] May 29, 1979

[54] AGRICULTURE CHEMICAL SPRAY VALVE

[75] Inventors: Jerold R. Jeffries, Augusta; H. Glen Fickel; Donald E. Schifferdecker, both of Wichita, all of Kans.

[73] Assignee: The Cessna Aircraft Company, Wichita, Kans.

[21] Appl. No.: 840,597

[22] Filed: Oct. 11, 1977

[51] Int. Cl.² .................................... F16K 11/02
[52] U.S. Cl. ........................ 137/625.46; 137/875; 137/876
[58] Field of Search ............... 137/625.46, 876, 875

[56] References Cited

U.S. PATENT DOCUMENTS

| 913,632 | 2/1909 | Foster | 137/625.46 X |
| 1,317,762 | 10/1919 | Shafer, Jr. | 137/876 |
| 2,856,952 | 10/1958 | Stillwagon | 137/625.46 X |

Primary Examiner—Arnold Rosenthal
Attorney, Agent, or Firm—Edward L. Brown, Jr.

[57] ABSTRACT

A low operating force valve which handles solutions having highly abrasive wettable powders. The valve is a low pressure butterfly-type, 3-way, two-position, valve; including a recirculating path in the closed position which is opened by a convex-shaped disc carried on a stem which rotates on the main valve shaft in conjunction with the two butterfly halves.

11 Claims, 3 Drawing Figures

AGRICULTURE CHEMICAL SPRAY VALVE

BACKGROUND OF THE INVENTION

The field of the invention is butterfly-type valves, more particularly a butterfly-type valve for controlling liquid chemical application from aircraft. The valve in its open position directs fluid to a spray outlet leading to a set of spray nozzles, and in its closed position directs the fluid to a recirculating outlet leading back to a reservoir thus keeping the fluid mixed and ready for instant delivery to the spray nozzles when desired.

A prior art search was made in Class 137, sub classes 625.12, 625.13, 630.17, 614.18, 625.44 and Class 251, sub class 305. U.S. Pat. No. 3,956,073, Carbone et al, discloses a butterfly-type valve with plural outlets but without a shield to close a passage. U.S. Pat. No. 3,078,070, Cooper, shows a butterfly-type valve which similarly can be applied to plural paths as in FIG. 5, but does not have a shield to close off one passage, as the present invention. U.S. Pat. No. 3,147,773, Matthews et al, discloses in FIG. 2 a pair of coordinated butterfly valves that close one passage when they open another, but is not like the present invention.

The type of agriculture chemical spray valve now in use throughout the industry is a ball-type valve which is rotated in a valve body to direct the fluid either to the spray outlet or to the recirculating outlet. The valve now in use also has an aspirator consisting of a passage from the spray outlet to a venturi section in the recirculating outlet which creates a suction whenever the fluid is being recirculated. This draws the fluid from the spray outlet thus facilitating prompt shutoff and eliminating dripping. This aspirator feature is also included in the butterfly-type valve of this invention. The fluid for spraying consists of an active chemical diluted with water and a wettable powder which is usually a fine-grained clay. The clay is a disirable ingredient for dilution but causes friction between the ball and the valve seals due to the clay's abrasiveness. This friction is sufficient to require a force of about 40 pounds (18 kilograms) to operate the valve after it has been in service a short time. A pilot of the aerial application aircraft at the end of a pass has to close the valve, place his plane in a climbing attitude, simultaneously execute a tight 180° turn, and then reopen the valve as he begins the next pass. When the valve requires a force of 40 pounds (18 kilograms) to operate, it can interfere with making such a maneuver efficiently, thus creating a problem. The problem is solved by this invention which markedly reduces the force needed to operate the valve. It is also important that the valve operate easily and quickly to insure coverage of the entire crop being sprayed and avoid a problem that would occur if the fluid reached other crops beyond either end of a pass on which the fluid is not wanted. Importance of avoiding overspray is seen in a list of chemicals used; not only pesticides, fungicides, and fertilizers but also herbicides to control weeds and defoliants to aid harvesting cotton and potatoes.

SUMMARY OF THE INVENTION

The butterfly-type agriculture chemical spray valve of this invention contains a molded valve insert, cylindrical in shape, within a valve body. A valve seat projects from the inside of the cylinder. One end of the valve insert adjoins an inlet to the valve body and the opposite end adjoins a spray outlet from the body. The insert also has openings normal to its axis; one a port leading to a recirculating outlet from the body and two other openings, diametrically opposite each other, having their centers in the same plane as the port and oriented at 90° on either side of the port. A shaft passes through the two diametrically opposite openings and extends through a shaft support to a point outside the valve body providing a means for operating the valve. A pair of vanes, semi-circular in shape, extend from opposite sides of the shaft within the insert and rest against the valve seat when the valve is in a closed position which directs the fluid from the inlet to the port leading to the recirculating outlet. When the shaft is rotated 90° from its closed position to an open position, the vanes are clear of the valve seat and direct the fluid from the inlet to the spray outlet. A stem extends at right angles from the shaft, within the insert, and a disc is located on the end of the stem. The disc has a diameter as large as the port to the recirculating outlet and the stem is oriented to the pair of vanes so that the disc acts as a shield covering the port when the butterfly valve is in the open position. The disc rotates when the pair of vanes do, both the stem and the vanes being attached to the shaft. When the butterfly valve is in the closed position, the disc is centered in the inlet which is larger in diameter than the disc and allows the fluid to flow freely around the disc from the inlet to the recirculating outlet. The shaft support, having an opening in its center to fit the shaft, is fastened to the body with bolts to hold the shaft and the insert in place. A pair of seals, semi-circular in shape, is fastened to the pair of vanes and bears against the valve seat to reduce leakage past the valve seat when the valve is in the closed position. No seal is needed on the disc because when the valve is in the open position any small leakage past the disc would merely be recirculated. Like agriculture chemical spray valves now in use, the valve includes an aspirator consisting of a venturi section in the recirculating outlet where a constricted throat causes a reduction in pressure, and a passage connecting the spray outlet with the recirculating outlet at a point where the pressure is reduced aspirates the fluid from the spray outlet when the valve is closed so that spraying is promptly shutoff.

An object of this invention is to provide an agriculture chemical spray valve that works easily to aid a crop dusting pilot.

Another object of this invention is to provide an agriculture chemical spray valve in which the working parts are long-wearing and can be replaced easily, thus reducing delay.

The problem in present agriculture chemical spray valves is high operating force due to friction between a movable ball element and the valve seals. The friction is caused by the abrasive nature of the clay used in the fluid. The friction is reduced in the butterfly-type valve by reducing the area between moving and stationary parts. The area is reduced to practically a line, which occurs at the point of closure between the valve seat and the seals, and only when the butterfly is in the closed position, plus small areas of bearing between the shaft and the insert. A laboratory test for durability showed that the butterfly-type valve maintained a low operating force of 5 pounds (2.25 kilograms) and good shutoff characteristics through 50,000 cycles. Tests also indicated that the butterfly-type valve required about one-eighth of the operating force of the conventional ball valve which is an obvious aid to the crop dusting pilot.

DESCRIPTION OF THE PREFERRED EMBODIMENT

Figure 1:
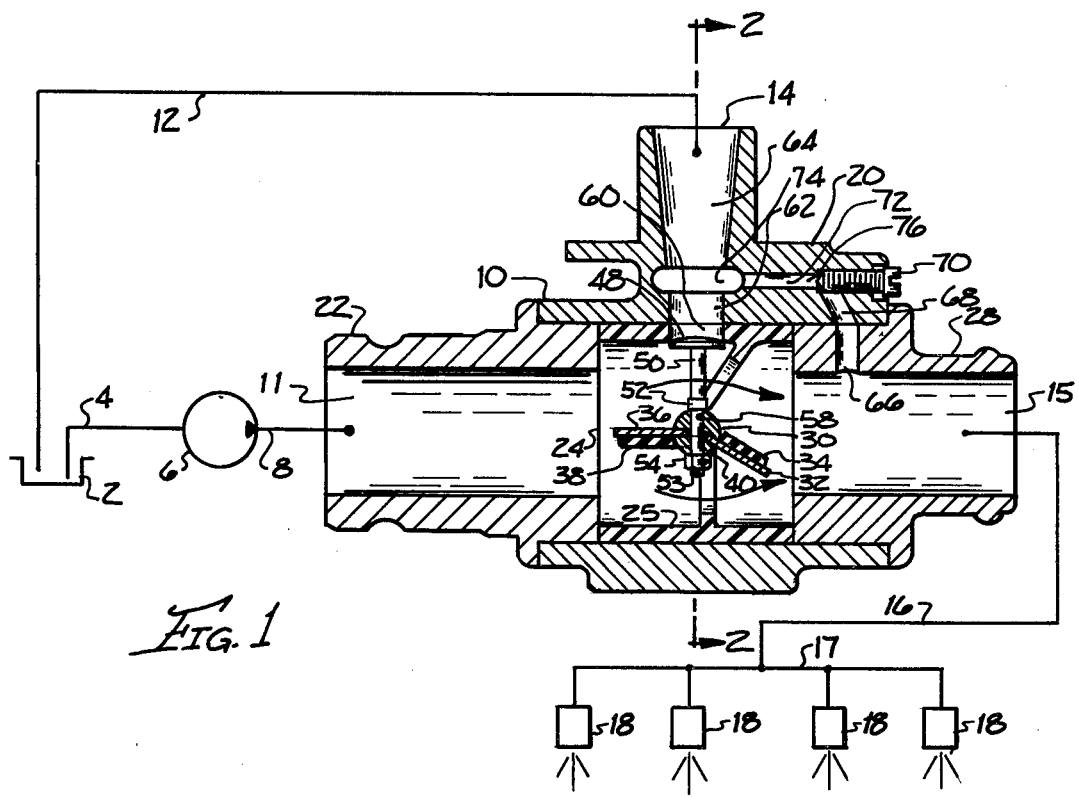
FIG. 1 is a longitudinal sectional view of an embodiment of the invention showing the valve in its open position and diagrammatically showing other parts of an agriculture chemical spray system.
Figure 2:
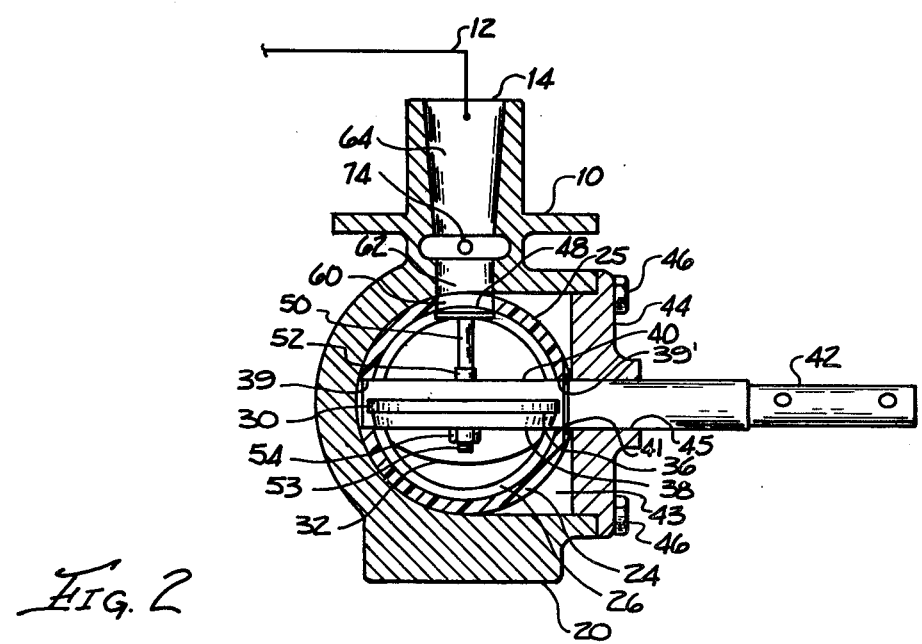
FIG. 2 is a transverse sectional view taken along the plane 2—2 of FIG. 1.
Figure 3:
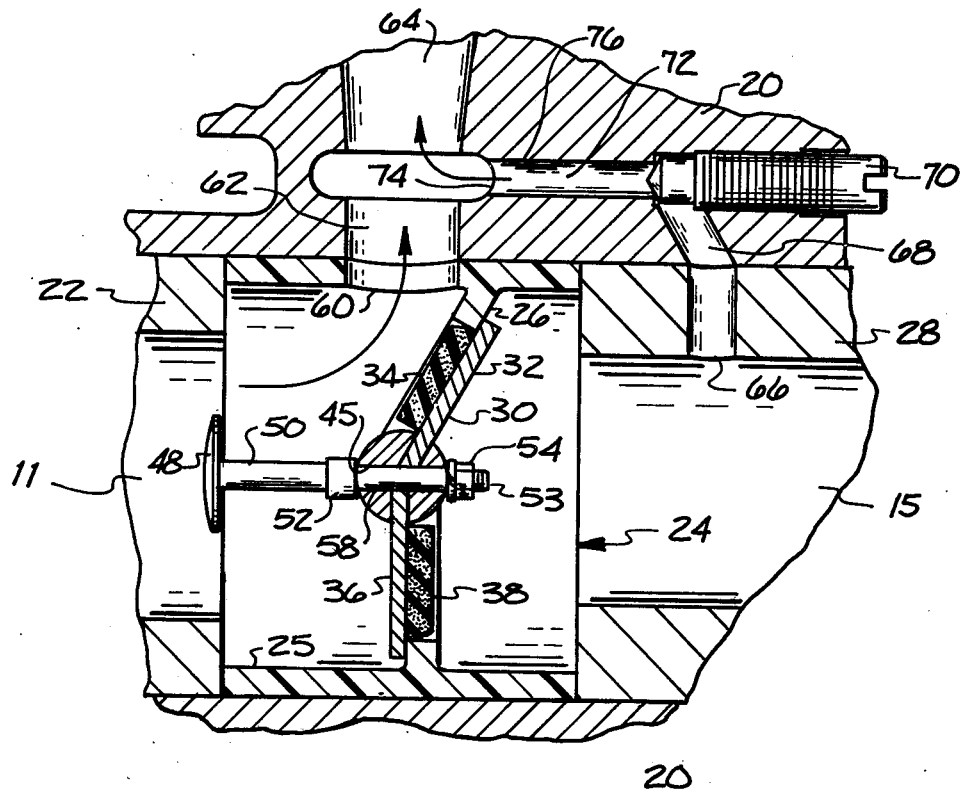
FIG. 3 is an enlarged longitudinal sectional view, similar to a portion of FIG. 1, except showing the valve in a closed position.

Referring first to FIG. 1, a fluid consisting of an active chemical in a fine wettable powder mixed with water is placed in a reservoir 2 of an aerial application aircraft, not shown. A pump 6 draws the fluid from the reservoir 2 through a pump suction line 4 and pumps it through a pump outlet line 8 to a valve inlet 11 of an agriculture chemical spray valve 10. The valve 10 has a valve body 20 and on one end a coupling adapter 22 having a lengthwise bore which forms the valve inlet 11. At the opposite end of the valve body 20 is a hose adapter 28 having a lengthwise bore which forms a spray outlet 15. The hose adapter connects in turn to a manifold 17 leading to a plurality of spray nozzles 18.

A butterfly valve 30 is located between the coupling adapter 22 and the hose adapter 28 in the center of the valve body 20. A butterfly valve insert 24 is cylindrical in shape, as are both the coupling adapter 22 and the hose adapter 28. Both of the adapters 22 and 28 are fastened to the valve body 20 by conventional bolts, not shown, and are sealed to the valve body 20 to prevent leakage by conventional O-rings in grooves, not shown. A recirculating outlet 14 extends from a side of the valve body 20 and a recirculating line 12 connects the outlet 14 with the reservoir 2.

The valve insert 24 has a shell 25, cylindrical in shape, having a recirculating port 60 and two diametrically opposite holes 39 and 39′ through the shell 25. A valve seat 26 projects from inside of the shell 25. A shaft 40 extends diametrically through the holes 39 and 39′ of the insert 24 with the axis of the shaft 40 lying in a plane transverse to the axis of the shell 25 and through the center of the port 60 which is located normal to the axis of the shaft 40.

The butterfly valve 30 has a first vane 32 and a second vane 36, both semicircular in shape, fastened to and projecting from the shaft 40 within the valve insert 24. A seal 34 and a seal 38, both also semicircular in shape, are fastened to the first vane 32 and the second vane 36, respectively, to seal the vanes 32 and 36, as can be seen in FIG. 3, to the valve seat 26 when the valve 30 is in a closed position. The butterfly valve 30, in addition to the vanes 32 and 36, the seals 34 and 38, and the shaft 40, has a stem 50 projecting at right angles to the shaft 40 and at right angles to the second vane 36. The shaft 40, having a transverse hole 58, provides a mounting means for the stem 50. The stem 50 has a shoulder 52 which, in combination with a threaded end 53, a self-locking nut 54, as shown in FIG. 3, provides means for mounting the stem 50 in the hole 58. The recirculating port 60 leads to a restricted throat 62, then through a venturi section 64, and then to the recirculating outlet 14.

In FIG. 3 a conventional aspirator 76 in the valve body 20 comprising: a connection 74 to the venturi section 64, a passage 72 from the connection 74 to an adjustment screw 70, a passage 68 leading from the adjustment screw 70 to an aspirator inlet 66 connecting with the spray outlet 15 in the hose adapter 28; provides a means when the valve 30 is moved to the closed position, for evacuating the fluid from the spray outlet 15 due to the venturi section 64 reducing pressure at the connection 74. This causes prompt reduction of pressure at the spray nozzles 18 which have conventional pressure operated shutoffs causing them to close automatically. The adjustment screw 70 is sealed to the valve body 20 with conventional O-rings in grooves, not shown.

As can best be seen in FIGS. 1 and 3, the stem 50 has at its outer end a disc 48 having a convex surface on its outer face. The disc 48 is approximately equal to the port 60 in diameter and definitely smaller in diameter than the inlet 11.

Referring now to FIG. 2, there is a valve insert opening 43 in the valve body 20. The valve insert opening 43 is closed by a shaft support 44 which is fastened to the valve body 20 by a plurality of bolts 46. The shaft support 44, having a hole 45, supports the shaft 40. A retaining ring 41 on the shaft 40 between the shaft support 44 and the shell 25 holds the shaft 40 in place in the valve body 20. A projecting end 42 of the shaft 40 provides a place to attach an operating handle, not shown. Other means for operating the valve 30, such as electrical and hydraulic actuators can be attached to the projecting end of shaft 42. The shaft support 44 is sealed to the valve body 20 and to the shaft 40 by conventional O-rings in grooves, not shown, to prevent leakage.

The materials used in the preferred embodiments are a cast aluminum alloy for the valve body 20, the adapters 22 and 28, and the shaft support 44; a high density polyethylene molding for the valve insert 24; a synthetic rubber for the seals 34 and 38; and a chrome-nickel stainless steel for the shaft 40, the vanes 32 and 36, the stem 50, the disc 48 and the adjustment screw 70.

OPERATION

The operation of the butterfly-type agriculture chemical spray valve 30 is to place the valve 30 in its closed position, as shown in FIG. 3, while the aircraft is on the ground and until the beginning of the first spraying pass over the crop. While crop dusting is the common term, the operation usually consists of spraying a water-based mixture rather than dusting with a dry powder. The closed position of valve 30 is its recirculating position, which keeps the fluid mixed by directing it from the valve inlet 11 past the disc 48 to the recirculating port 60 and out the recirculating outlet 14, as can be followed in FIG. 1, to the reservoir 2 from which it is drawn by the pump 6 and returned to the inlet 11. The valve 30 has one inlet 11 and two outlets, the main outlet is the spray outlet 15 and the auxiliary outlet is the recirculating outlet 14. When the aircraft reaches the beginning of a spraying pass, the pilot rotates the shaft 40, turning the vanes 32 and 36 away from the valve seat 26 to the open position of valve 30 and rotating the disc 48 to where it serves as a shield to block the recirculating port 60, as can be noted in FIG. 1, directing the fluid to the outlet 15, thence through the spray line 16 and manifold 17 to a plurality of spray nozzles 18 spaced along and beneath the lower wing of the aircraft. When reaching the end of the pass, the pilot turns the shaft 40 back to its recirculating position and the fluid is again directed back to the reservoir 2. To prevent spraying fluid where it is not wanted, it is common practice in the industry to include an aspirator in agriculture chemical spray valves, and spring-loaded shutoffs at each nozzle which close when the pressure drops to a few pounds. Such an aspirator 76 is included in the butterfly valve 30. When the valve 30 is in the recirculating position, it draws the fluid from the spray outlet 15, removing pressure from the spray line 16 and manifold 17 causing the nozzles 18 to shutoff immediately. Action of the aspirator 76 can be modified by the adjustment screw 70. The butterfly-type valve 30 can be operated easily because there is no friction throughout most of its rotating arc except that developed in the relatively small bearing areas between the shaft 40 and the holes 39 and 39' in the shell 25. At one point in operating valve 30, that is when it is starting to open, there is some friction to overcome along the line of contact of the seals 34 and 38 with the valve seat 26. This is a small fraction of area subject to friction in conventional ball-type agriculture chemical spray valves.

Having described the invention with sufficient clarity to enable those familiar with the art to construct and use it, we claim:

1. An improved agriculture chemical spray valve having a vane rotatable on a shaft to an open position directing a fluid from an inlet of the valve to a main outlet of the valve, and to a closed position directing the fluid to an auxiliary outlet of the valve which connects with a recirculating line, wherein the improvement comprises:
   the inlet being larger in diameter than the auxiliary outlet;
   a stem extending from the shaft at right angles to the vane, toward the auxiliary outlet when the valve is in the open position, and toward the inlet when the valve is in the closed position; and
   a disc mounted on the end of the stem sized to cover the auxiliary outlet when the valve is in the open position but allows the fluid to flow around the disc in the larger inlet when the valve is in the closed position directing the fluid to the auxiliary outlet and the recirculating line.

2. An improved agriculture chemical spray valve as recited in claim 1, wherein the valve further comprises:
   a body and
   a valve liner insert molding, within the body, enclosing the vane and the disc, having a molded valve seat and having molded openings comprising the inlet, the auxiliary outlet, and the main outlet.

3. An improved agriculture chemical spray valve as recited in claim 1, wherein the vane and the disc are rotatable through an angle of substantially 90 degrees between the open position and the closed position.

4. An improved agriculture chemical spray valve for use in spraying a fluid from an aircraft, the valve having:
   a body;
   an inlet to the body;
   a spray outlet from the body to a spray line;
   a recirculating outlet from the body; and
   an aspirator in the recirculating outlet having an aspirator inlet in the spray line for aspirating the fluid from the spray line when the recirculating outlet is in use;
   wherein the improvement comprises:
   a valve liner insert, within the body, cylindrical in shape, having a circular recirculating port connecting to the aspirator;
   a valve seat formed in the insert by an inwardly projecting arcuate rib;
   a shaft passing diametrically through the valve liner insert and extending outside of the body;
   a vane attached to and projecting from the shaft, within the valve liner insert, and operable by rotation of the shaft to either an open position which directs the fluid to the spray outlet, or to a closed position, against the valve seat, which directs the fluid to the recirculating port;
   a stem, attached to and perpendicular to the shaft, within the valve liner insert, located so that when the vane is in the open position the stem extends to the recirculating port and when the vane is in the closed position the stem extends axially along the insert toward the inlet; and
   a disc on the outer end of the stem having a diameter sufficient to cover the recirculating port and smaller than that of the inlet so that when the vane is in the open position the disc is located in front of the recirculating port, thus blocking the port, and when the vane is in the closed position the disc is centered in the inlet allowing the fluid to flow past.

5. An improved agriculture chemical spray valve as recited in claim 4, further comprising a seal on the vane for sealing the vane against the valve seat when the vane is in the closed position.

6. An improved agriculture chemical spray valve as recited in claim 4, in which the valve liner insert is an abrasion resistant plastic molding.

7. An improved agriculture chemical spray valve as recited in claim 6, in which the valve liner insert is molded in one piece.

8. An improved agriculture chemical spray valve as recited in claim 4, in which a sub-assembly, comprising the disc, the stem, and the vane, all attached to the shaft within the valve liner insert, forms a unit, thus facilitating replacement of parts subject to wear by the fluid and by the rotation of the shaft.

9. An improved agriculture chemical spray valve as recited in claim 8, further comprising a shaft support fastened to the body, having a hole to surround and support the shaft and covering an opening in the body through which the sub-assembly can be installed.

10. An improved agriculture chemical spray valve as recited in claim 9, in which means for sealing are placed between the body and the shaft support and also between the shaft support and the shaft to reduce leakage of the fluid.

11. An improved agriculture chemical spray valve as recited in claim 4, in which the disc has a convex outer surface for facilitating the flow of the fluid when the valve is in the closed position.

* * * * *